Nov. 4, 1924.
F. ROMAN
1,514,173
WATER DISTRIBUTION SYSTEM
Filed Jan. 31, 1923
2 Sheets-Sheet 2

Inventor
Frank Roman,
By
Attorneys

Patented Nov. 4, 1924.

1,514,173

UNITED STATES PATENT OFFICE.

FRANK ROMAN, OF FREELAND, PENNSYLVANIA.

WATER-DISTRIBUTION SYSTEM.

Application filed January 31, 1923. Serial No. 616,116.

*To all whom it may concern:*

Be it known that I, FRANK ROMAN, a citizen of the United States, residing at Freeland, in the county of Luzerne and State of Pennsylvania, have invented certain new and useful Improvements in Water-Distribution Systems, of which the following is a specification.

This invention relates to water distribution systems, and has for one of its objects to provide a means for automatically controlling the flow of water or other liquid from a pipe or main, whereby such liquid may be discharged from said pipe or main at predetermined intervals and for predetermined periods of time.

A further object of the invention is to provide a construction of the class described which will be simple to construct, comparatively inexpensive to manufacture and install and which may be readily adjusted to vary the length of time elapsing between each discharge, as well as to vary the length of time of the discharge itself.

As an example of the practical application of the invention, it might be said that in irrigation projects or for sprinkling domestic gardens and the like, it is frequently desirable that the water be discharged for certain lengths of time each day on successive or alternate days, and the present invention is particularly applicable to such a system.

With the above and other objects in view, which will appear as the description proceeds, the invention consists in the novel details of construction and combinations of parts more fully hereinafter disclosed and particularly pointed out in the appended claims.

Figure 1:
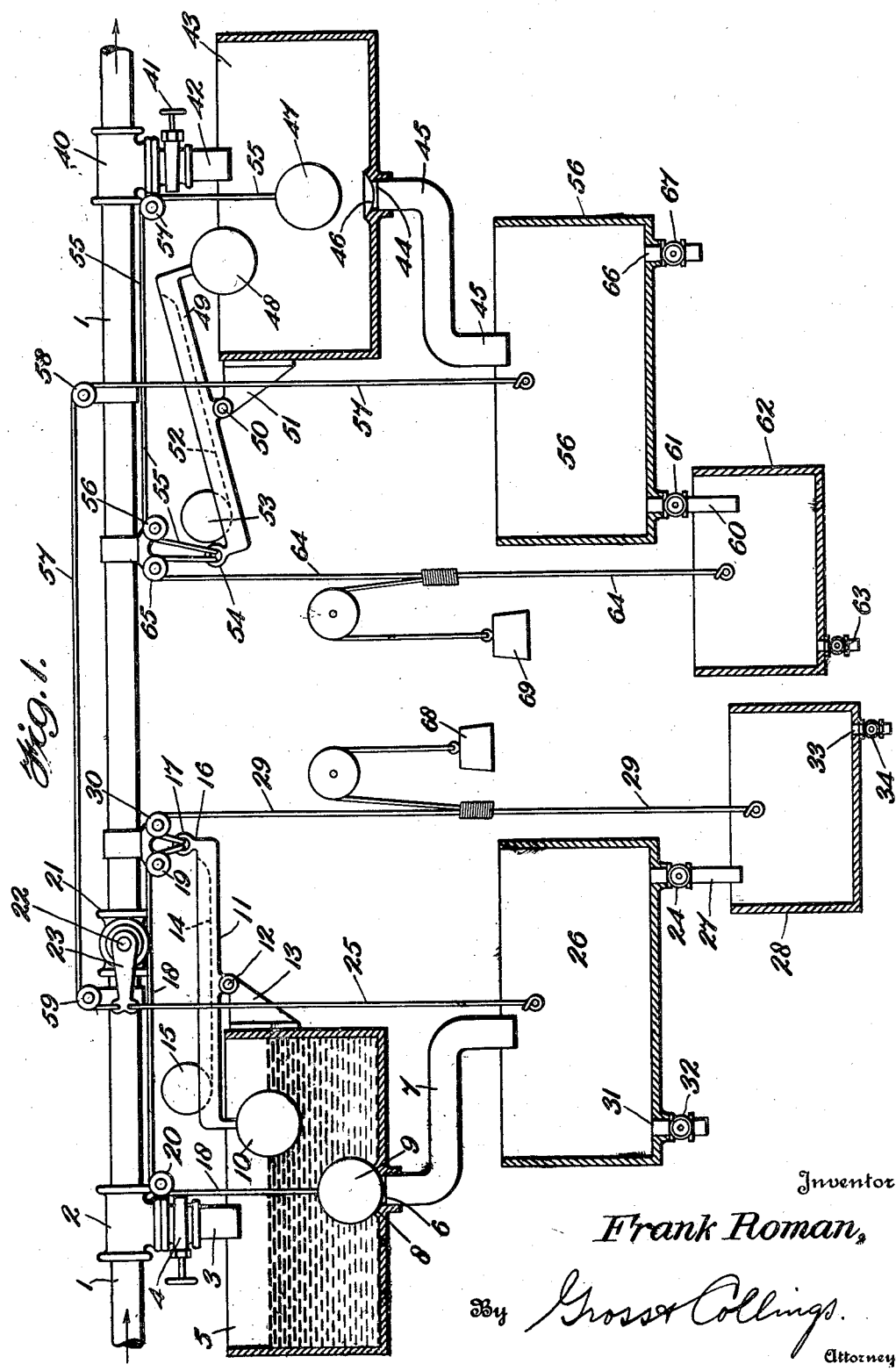
Figure 2:
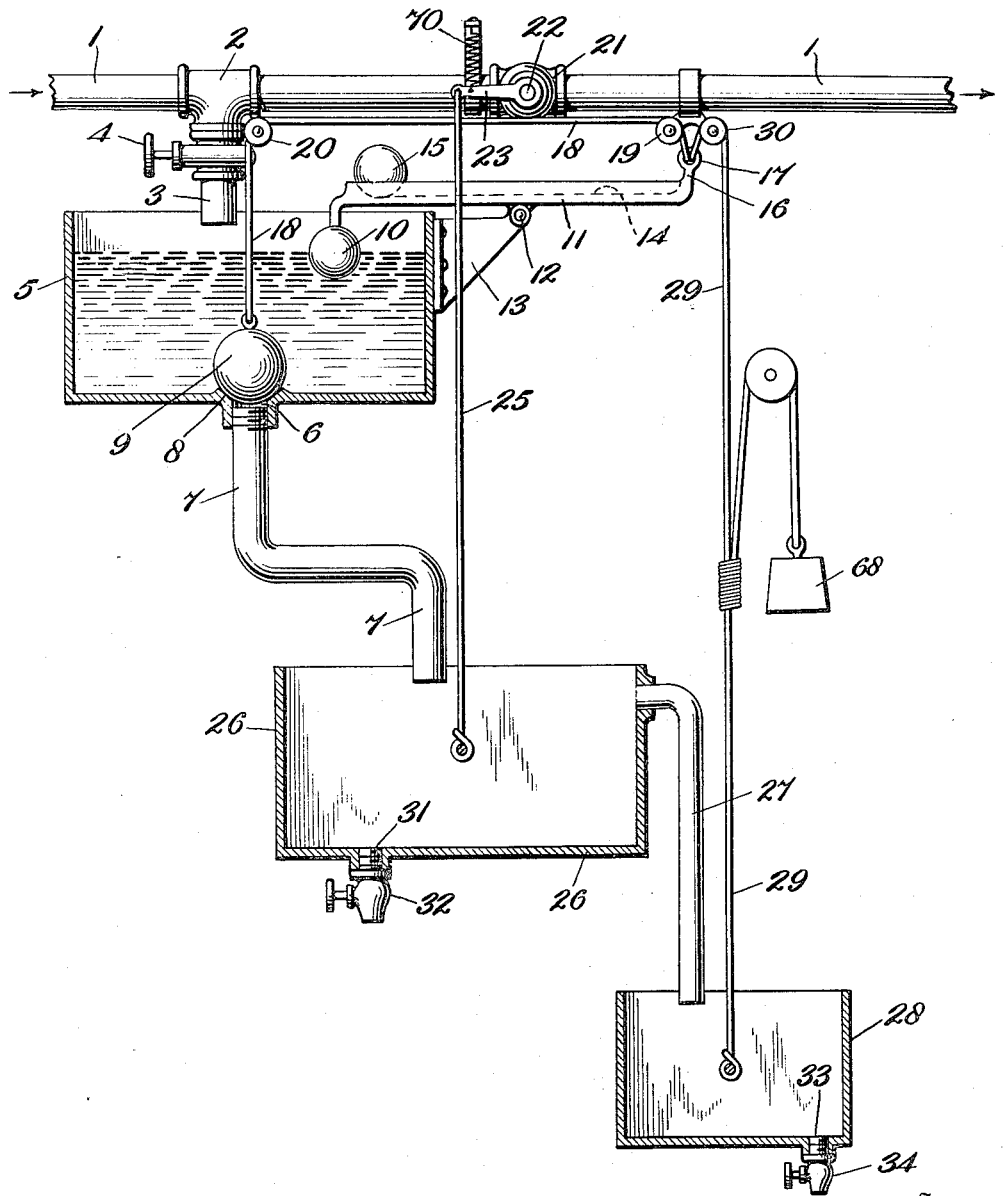

Referring to the accompanying drawings forming a part of this specification:

Figure 1 is a diagrammatic sectional elevational view of one form of apparatus constructed in accordance with my invention; and, Fig. 2 is a similar view of a somewhat modified form.

Referring now more particularly to Fig. 1, the numeral 1 indicates a supply pipe or main adapted to receive water from any suitable source of supply which may flow therethrough in the direction indicated by the arrows. The said main 1 is provided with a branch or T 2 leading to an auxiliary discharge pipe 3, which may be controlled by the manually operable valve 4. The said pipe 3 is arranged to discharge into a tank or vessel 5 of any desired capacity, and which may be suitably supported or fixed in any manner not shown. The said vessel 5 is provided with a suitable discharge opening 6 to which is connected a discharge pipe 7, and the said opening 6 may be provided with a valve seat 8 adapted to coact with the ball valve 9 for controlling the discharge of liquid from the said vessel.

The valve 9 is preferably controlled by means of a float 10 which is carried by a lever 11 pivoted as at 12 to a bracket 13, secured to the said tank or receptacle 5 or to any other desired support. The said lever 11 is provided with a longitudinal depression or groove 14 to receive a weighted ball or other element 15 which is adapted to travel longitudinally of the lever 11 in the said groove 14, and to thereby shift the center of gravity of the lever for a purpose which will be more fully disclosed below.

The float 10 is rigidly secured to one end of the said lever within the tank or receptacle 5, while the other end of the said lever is provided with an angularly disposed extension 16, having an eye 17 to which is secured one end of a rope, cable, chain, or other flexible connection 18, which passes over suitable pulleys or sheaves, 19 and 20, and has its other end secured to the ball valve 9, as will be clear from the drawings.

The main or pipe 1 is provided with a gate valve 21, the stem of which, 22, is provided with a suitable operating lever 23, to which is secured a rod or chain 25, carrying at its lower end a tank or receptacle 26 which is arranged in position to receive the discharge from the pipe 7 of the receptacle 5. The said receptacle 26 is provided with a discharge pipe 27, which is adapted to discharge into a third tank or receptacle 28, suspended by means of a cable, chain, or other flexible connection 29, which passes over a sheave or pulley 30 and has its end connected to the eye 17 of the lever 11.

The receptacle 26 is also provided with an auxiliary outlet 31, controlled by a manually operable valve 32, while the receptacle 28 is likewise provided with an outlet 33 controlled by the manually operable valve 34.

The above described mechanism serves to open the valve 21 to permit the passage of water through the main 1 to the sprinkler or other discharge. In order that the said valve may be automatically closed after this flow of water has been permitted for a predetermined length of time, there is provided a second mechanism for closing the valve, which is a substantial duplicate of that above described for opening the said valve. This portion of the invention comprises the T connection 40 in the main 1, which serves to supply water through the manually controlled valve 41 to the branch pipe 42, which discharges into a fixed receptacle or tank 43. This said tank or receptacle is provided with the discharge opening 44 which communicates with the discharge pipe 45 and the said opening 44 is provided with a valve seat 46 adapted to receive and co-act with the ball valve 47 to control the discharge of water from the said receptacle 43. The said ball valve 47 may be controlled in a manner similar to the ball valve 9, by means of a float 48, carried by one end of the lever 49, which is pivoted as at 50 to the bracket 51, secured to the said receptacle 43. The said lever 49 is provided with a groove 52 in which the weighted ball 53 is adapted to travel in the same manner as that above disclosed in connection with the ball 15, and the outer end of the said lever 49 is provided with an eye 54 in which is secured one end of a rope or cable 55, passing over the pulleys or sheaves 56 and 57, and having its other end suitably connected to the ball valve 47, as shown.

The pipe 45 discharges into a second receptacle 56, which is suitably supported by means of the rope or cable 57, passing over the sheaves or pulleys 58 and 59, and having its end connected to the valve control lever 23, as will be clear from the drawing. The said receptacle or tank 56 is provided with the discharge pipe 60 which may be controlled by a suitable valve 61, and which is adapted to discharge the water into the receptacle or tank 62, as shown. The said tank 62 is provided with the valve controlled outlet 63, and is movably supported by means of a cable or chain 64, passing over the sheave or pulley 65, and having its upper end secured in the eye 54 of the lever 49. The tank or receptacle 56 may also be provided with the auxiliary discharge pipe 66, controlled by the valve 67, as shown. Suitable weights 68 and 69, may be provided to counter-balance the weights of the tanks 28 and 62 respectively, when empty.

The operation of the device is as follows: Assuming the parts to be in the positions illustrated, the valve 4 is first adjusted to so control the passage of water from the main 1 through the branch pipe 3 that the receptacle 5 will be filled in a certain predetermined length of time. It will be understood, of course, that this length of time may be varied to suit the conditions under which the apparatus is operating, and may vary from say a few minutes to one hour, one day, or several days, as may be desired.

In the meantime the valve 41 has also been adjusted to control the passage of water from the main 1 through the branch pipe 42 into the receptacle 43 in a manner similar to the adjustment of the valve 4. The valve 41 may be so adjusted that the filling of the receptacle 43 may be accomplished in the same time, or preferably in less time than the filling of the receptacle 5, to the end that the times during which the water is permitted to flow from the main 1 and during which it is cut off may be varied to suit the operating conditions, as will presently appear. For example if it is desired that the water flow for a period of time equal to that during which it is cut off the valve 41 would be so adjusted that the receptacle 43 will be filled in approximately one-half the time which it takes to fill the receptacle 5 through the valve 4 and branch pipe 3.

As the liquid level within the receptacle 5 rises above the point indicated in the drawings, the liquid will act upon the float 10 to raise the same and to thereby slightly incline the lever 11, raising its left hand end and lowering its right hand end. This inclination of the lever will cause the weighted ball 15 to move from the left hand end to the right hand end of the lever, thereby further depressing the latter end, owing to the shifting of the center of gravity, which lowering will produce a pull upon the cables or chains, 18 and 29, as will be readily understood.

The movement thus imparted to the cable 18 will, in turn, be transmitted to the ball valve 9, unseating the same and permitting the liquid within the receptacle 5 to flow therefrom through the discharge pipe 7 and into the receptacle 26. The ball valve will be maintained in its open position during the discharge of the liquid, due to the fact that the weighted ball 15 is still at the right hand end of the lever 11, as will be readily understood.

The discharge of the liquid into the receptacle 26 will increase the weight of the same, whereupon the said receptacle 26 will move downwardly, which motion will be transmitted through the connection 25 to the valve lever 23 and valve stem 22, thereby opening the valve 21 and permitting the flow of water through the main or pipe 1 to the sprinkler or other discharge which may be connected with the right hand end of the said pipe 1.

The discharge pipe 27 of the receptacle 26 is preferably of smaller diameter than the pipe 7, and may be provided with a controlling valve 24, if desired, by means of which the flow of water therethrough may be controlled. It thus results that although water which is discharged into the receptacle 26 from the pipe 7 may flow continuously therefrom through the pipe 27, at the same time the rate of discharge will be materially lower than the rate of flow from the pipe 7 and the receptacle 26 will thus be gradually partially filled.

The relative sizes of the pipes 7 and 27 being fixed, it will of course result that with a given amount of water in the receptacle 5, which is in turn transmitted to the vessel 26, if the valve 24 is open at all, a certain proportion of the said water will escape through the pipe 27 during the time of discharge of the pipe 7, while the remainder will accumulate within the vessel 26.

Should it be desired to dispose of a portion of the water thus accumulated, the valve 32 may be opened to any desired extent and some of the water in the vessel 26 discharged through the passage 31.

The water which passes from the vessel 26 through the pipe 27 will be in turn discharged into the vessel 28, and as the weight of this vessel is increased, it will move downwardly, which motion will be transmitted by means of the cable or chain 29 to the right hand end of the lever 11, thus moving the said right hand end upwardly and restoring the parts to the positions illustrated. This will, of course, re-seat the valve 9 and will also cause the weighted ball 15 to return to the left hand end of the lever, as indicated.

The water in the vessel 28 may be discharged from the outlet 33 at any desired rate by adjustment of the control valve 34, as will be readily understood.

As soon as the valve 21 is opened, as above described, water will flow through the right hand portion of the main or pipe 1, and the major part thereof will be discharged to the sprinkler or other mechanism, not shown. A portion of the said water, however, will pass through the branch pipe 42, by way of the valve 41 and T 40 into the receptacle 43. The valve 41 having been adjusted so that the receptacle will be filled in say one-half the time required to fill the receptacle 5, the float 48 therein will of course act sooner than the float 10 in the receptacle 5. The action of this float and its associated parts will be similar to that above disclosed in connection with the float 10, and will have the effect of raising the ball valve 47, thus permitting the discharge of the water in the receptacle 43 through the pipe 45 into the receptacle 56.

As the weight of this receptacle is thus increased it will descend, and through its chain or cable connections 57, its motion will be transmitted to the valve actuating lever 23, which will be moved in the proper direction to close the valve 21. The supply of water to the receptacle 43 will thus be cut off until the valve 21 is again opened in the manner above disclosed.

At this point the receptacle 5 will be, say approximately half filled, and the valve 21 will thus remain closed until the said receptacle 5 is again completely filled to the level indicated in the drawings, at which time the valve 21 will be again opened, permitting the flow of the water through the right hand portion of the main 1 and into the receptacle 43, in the manner above described.

The water which has been discharged into the receptacle 56 through the pipe 45, will, in turn, be discharged through the pipe 60 into the receptacle 62, which will restore the lever 49 and float 48 to their initial positions in the same manner as the lever 11 and float 10 were restored by the receptacle 28.

It will, of course, be understood, that by suitably manipulating the valves 4 and 41, the periods of time during which the flow of water in the main 1 is cut off or permitted may be controlled at the discretion of the operator. In this manner the water may be so controlled that it will discharge for a period of time equal to that during which it is cut off, or these two periods may be made different to suit different operating conditions.

In the form of the invention illustrated in Fig. 2 only the left hand portion of the apparatus illustrated in Fig. 1 is employed, and that for the purpose of opening the main valve 22. In this form the valve is adapted to be closed by a means such as the spring 70, which will be of sufficient strength to close the valve when the tank 26 is emptied. The spring or other means 70 thus takes the place of the right hand portion of the apparatus shown in Fig. 1, and this form of the invention is adapted for use in small installations.

It will thus be seen that this invention provides a relatively simple and effective means whereby the flow of water through a main to a sprinkler or irigation system or to other apparatus may be intermittently permitted at predetermined intervals and for predetermined times, and while two forms of the invention have been illustrated and described, it is obvious that those skilled in the art may vary the precise details of construction as well as the arrangement of parts without departing from the spirit of the invention, and therefore it is not wished to be limited to the above disclosure except as may be required by the accompanying claims.

What I claim is:

1. In an apparatus of the class described, a fluid main; a main valve for controlling the discharge of fluid from said main; a receptacle arranged on the supply side of said valve to receive fluid from said main; a second valve for controlling passage of fluid from said main to said receptacle; a second receptacle; valve controlled connections for transferring fluid from said first to said second receptacle; connections between said second receptacle and said main valve whereby movement of said receptacle will open said valve; means for discharging fluid from said second receptacle; and means for automatically closing said main valve when said second receptacle is empty.

2. In an apparatus of the class described, a fluid main; a main valve for controlling the discharge of fluid from said main; a receptacle arranged on the supply side of said valve to receive fluid from said main; a second valve for controlling passage of fluid from said main to said receptacle; a second receptacle; fluid conducting connections between said first and second receptacles; a float actuated valve for controlling passage of fluid through said connections; means for maintaining said float actuated valve open at predetermined times; connections between said second receptacle and said main valve, whereby movement of the former will open the latter; means for discharging fluid from said second receptacle; and means for automatically closing said main valve when said second receptacle is empty.

3. In an apparatus of the class described, a fluid main; a main valve for controlling the discharge of fluid from said main; a receptacle arranged on the supply side of said valve to receive fluid from said main; a second valve for controlling passage of fluid from said main to said receptacle; a second receptacle; fluid conducting connections between said first and second receptacles; a float actuated valve for controlling passage of fluid through said connections; means for maintaining said float actuated valve open at predetermined times; connections between said second receptacle and said main valve, whereby movement of the former will open the latter; means for discharging fluid from said second receptacle; means for automatically closing said float actuated valve; and means for automatically closing said main valve when said second receptacle is empty.

4. In an apparatus of the class described, a fluid main; a main valve for controlling the discharge of fluid from said main; a receptacle arranged on the supply side of said valve to receive fluid from said main; a second valve for controlling passage of fluid from said main to said receptacle; a second receptacle; fluid conducting connections between said first and second receptacles; a float actuated valve for controlling passage of fluid through said connections; means for maintaining said float actuated valve open at predetermined times; connections between said second receptacle and said main valve, whereby movement of the former will open the latter; means for discharging fluid from said second receptacle; means actuated by the discharge of fluid from said second receptacle for automatically closing said float actuated valve; and means for automatically closing said main valve when said second receptacle is empty.

5. In an apparatus of the class described, a fluid main; a main valve for controlling the discharge of fluid from said main; a receptacle arranged on the supply side of said valve to receive fluid from said main; a second valve for controlling passage of fluid from said main to said receptacle; an arm pivotally carried by said receptacle; a float carried by one end of said arm within said receptacle; a second receptacle; fluid conducting connections between said first and second receptacles; a valve controlling said connections; connections between said last named valve and said arm, whereby movement of the latter will open the former; connections between said main valve and said second receptacle, whereby movement of the latter will open the former; means for discharging fluid from said second receptacle; and means for automatically closing said main valve when said second receptacle is empty.

6. In an apparatus of the class described, a fluid main; a main valve for controlling the discharge of fluid from said main; a receptacle arranged on the supply side of said valve to receive fluid from said main; a second valve for controlling passage of fluid from said main to said receptacle; an arm pivotally carried by said receptacle; a float carried by one end of said arm within said receptacle; a second receptacle; fluid conducting connections between said first and second receptacles; a valve controlling said connections; connections between said last named valve and said arm, whereby movement of the latter will open the former; means carried by said arm for holding said last named valve open; connections between said main valve and said second receptacle, whereby movement of the latter will open the former; means for discharging fluid from said second receptacle; and means for automatically closing said main valve when said second receptacle is empty.

7. In an apparatus of the class described, a fluid main; a main valve for controlling the discharge of fluid from said main; a receptacle arranged on the supply side of said valve to receive fluid from said main; a second valve for controlling passage of fluid from said main to said receptacle; an arm pivotally carried by said receptacle; a float carried by one end of said arm within said receptacle; a second receptacle; fluid conducting connections between said first and second receptacles; a valve controlling said connections; connections between said last named valve and said arm, whereby movement of the latter will open the former; means comprising a shiftable weight carried by said arm for holding said last named valve open; connections between said main valve and said second receptacle, whereby movement of the latter will open the former; means for discharging fluid from said second receptacle; and means for automatically closing said main valve when said second receptacle is empty.

8. In an apparatus of the class described, a fluid main; a main valve for controlling the discharge of fluid from said main; a receptacle arranged on the supply side of said valve to receive fluid from said main; a second valve for controlling passage of fluid from said main to said receptacle; an arm pivotally carried by said receptacle; a float carried by one end of said arm within said receptacle; a second receptacle; fluid conducting connections between said first and second receptacles; a valve controlling said connections; connections between said last named valve and said arm, whereby movement of the latter will open the former; means carried by said arm for holding said last named valve open; connections between said main valve and said second receptacle, whereby movement of the latter will open the former; means for discharging fluid from said second receptacle; means for automatically closing said third named valve; and means for automatically closing said main valve when said second receptacle is empty.

9. In an apparatus of the class described, a fluid main; a main valve for controlling the discharge of fluid from said main; a receptacle arranged on the supply side of said valve to receive fluid from said main; a second valve for controlling passage of fluid from said main to said receptacle; an arm pivotally carried by said receptacle; a float carried by one end of said arm within said receptacle; a second receptacle; fluid conducting connections between said first and second receptacles; a valve controlling said connections; connections between said last named valve and said arm, whereby movement of the latter will open the former; means carried by said arm for holding said last named valve open; connections between said main valve and said second receptacle, whereby movement of the latter will open the former; means for discharging fluid from said second receptacle; means actuated by the discharge of fluid from said second receptacle for automatically closing said third named valve; and means for automatically closing said main valve when said second receptacle is empty.

10. In an apparatus of the class described, a fluid main; a main valve for controlling the discharge of fluid from said main; a receptacle arranged on the supply side of said valve to receive fluid from said main; a second valve for controlling passage of fluid from said main to said receptacle; an arm pivotally carried by said receptacle; a float carried by one end of said arm within said receptacle; a second receptacle; fluid conducting connections between said first and second receptacles; a valve controlling said connections; connections between said last named valve and said arm, whereby movement of the latter will open the former; means comprising a shiftable weight carried by said arm for holding said last named valve open; connections between said main valve and said second receptacle, whereby movement of the latter will open the former; means for discharging fluid from said second receptacle; means comprising a third movable receptacle arranged to receive fluid discharge from said second receptacle, and connections therebetween and said arm, for automatically closing said third named valve; and means for automatically closing said main valve when said second receptacle is empty.

In testimony whereof I affix my signature.

FRANK ROMAN.